Feb. 11, 1941.    H. H. GORRIE    2,231,568
CONTROL SYSTEM
Filed July 2, 1938    3 Sheets-Sheet 1

Inventor
HARVARD H. GORRIE
By Raymond D. Jenkins
Attorney

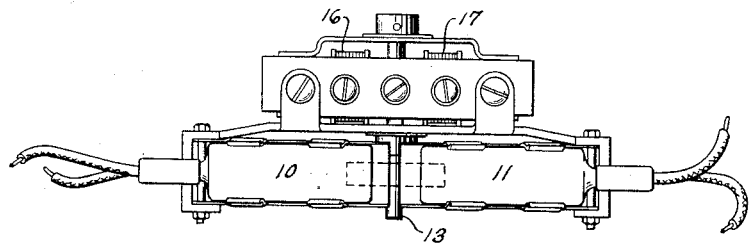
FIG. 2
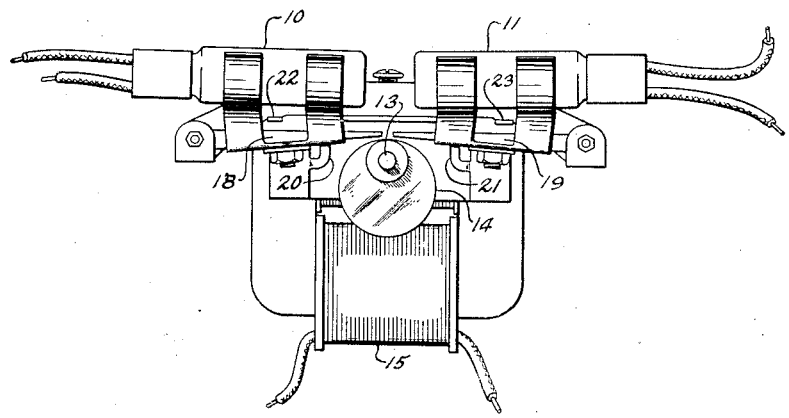
FIG. 3
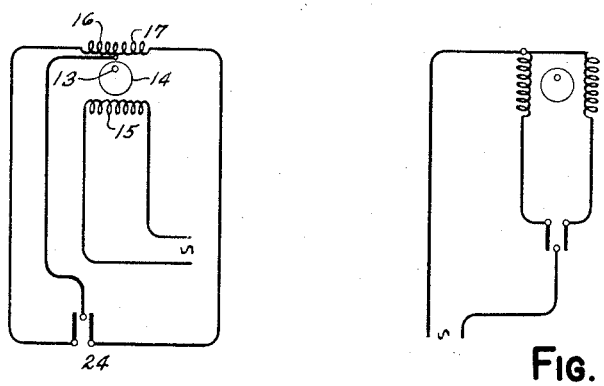
FIG. 4
FIG. 5
Inventor
HARVARD H. GORRIE
By Raymond D. Junkins.
Attorney

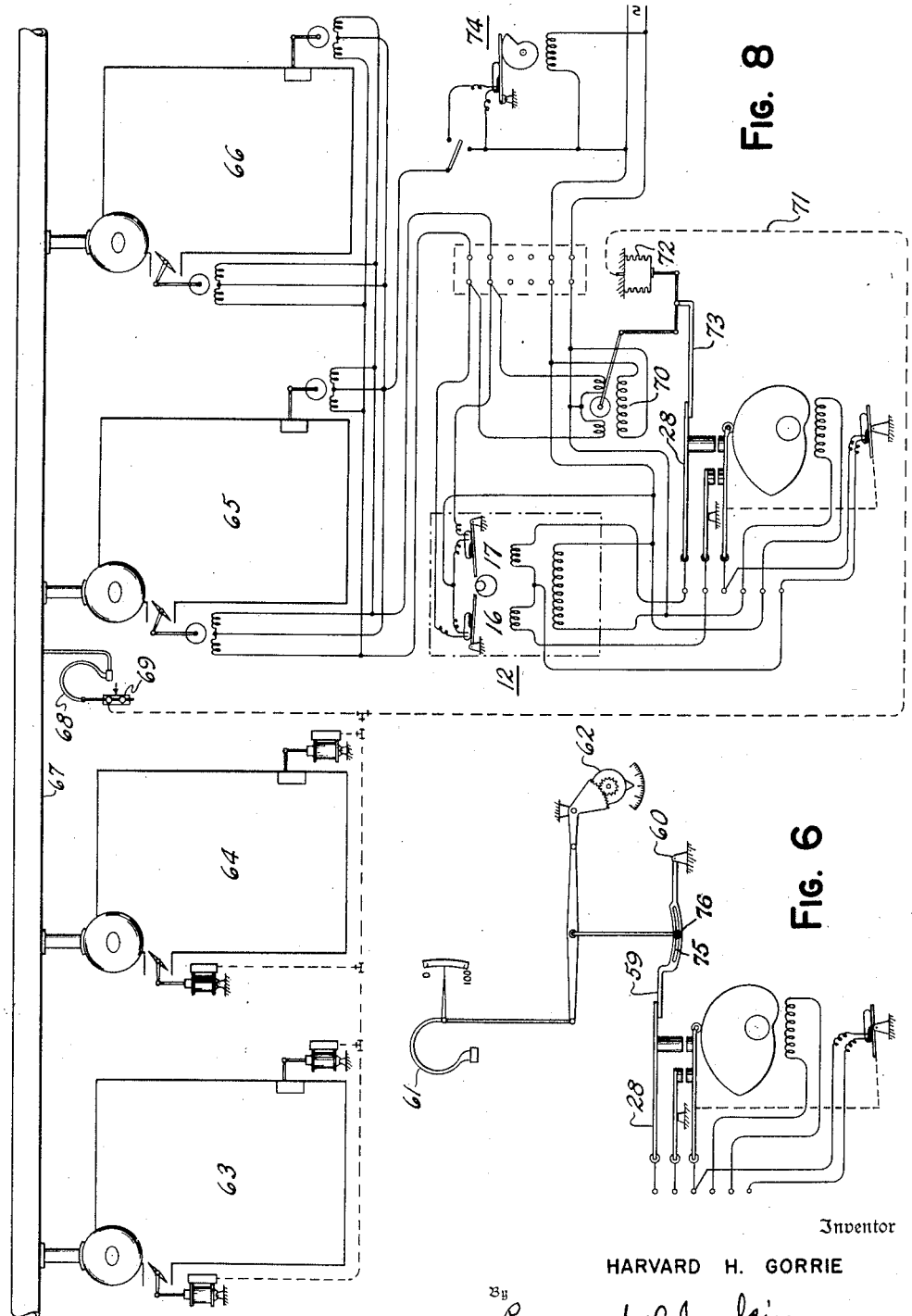

Patented Feb. 11, 1941

2,231,568

UNITED STATES PATENT OFFICE 2,231,568

CONTROL SYSTEM

Harvard H. Gorrie, Cleveland Heights, Ohio, assignor to Bailey Meter Company, a corporation of Delaware Application July 2, 1938, Serial No. 217,313

6 Claims. (Cl. 236—26)

This invention relates to control systems, such as for establishing or maintaining constant any desired electrical, thermal, chemical, physical or other variable condition, or relation of conditions, through the control of a corrective agent or agents. As one example, my invention relates to control systems wherein a fluid pressure and electrical energy are utilized in combination as motive forces for actuating devices to control the rate of application of corrective agents.

It is one object of my invention to provide a control system wherein the condition under control is rapidly restored to a predetermined value upon deviation therefrom without over-travel or hunting.

Another object is to control the rate of application of a corrective agent in relation to both extent and sense of the departure of the controlled variable from a predetermined condition.

A further object is to provide an apparatus responsive to the resultant of activating impulses of opposite sense, wherein such resultant determines the sense and amount of actuation applied to the valve or other mechanism under control.

Still another object is to provide an apparatus which is responsive to the controlled variable, and which through a combination of pressure fluid and electrically motivated corrective devices restores the variable to a predetermined condition.

Still another object is to provide an improved contactor which periodically divides time into equal increments, during each such increment initiates an electrical impulse in a given sense and of uniform time duration, and during said time interval may initiate an electrical impulse in opposite sense but of variable time duration dependent upon the then value of the variable condition to which the mechanism is responsive.

These and other objects will be apparent from the following description and drawings, in which:

Fig. 2 is a plan view of a relay.

Fig. 3 is an elevation of the relay of Fig. 2.

Fig. 4 is a simplified wiring diagram of the relay of Figs. 2 and 3.

Fig. 5 is a wiring diagram of a modified type of relay.

Fig. 6 is a somewhat diagrammatic showing of a part of Fig. 1 embodying a modification thereof.

Fig. 8 diagrammatically illustrates a control system in connection with a plurality of vapor generators.

Figure 1:
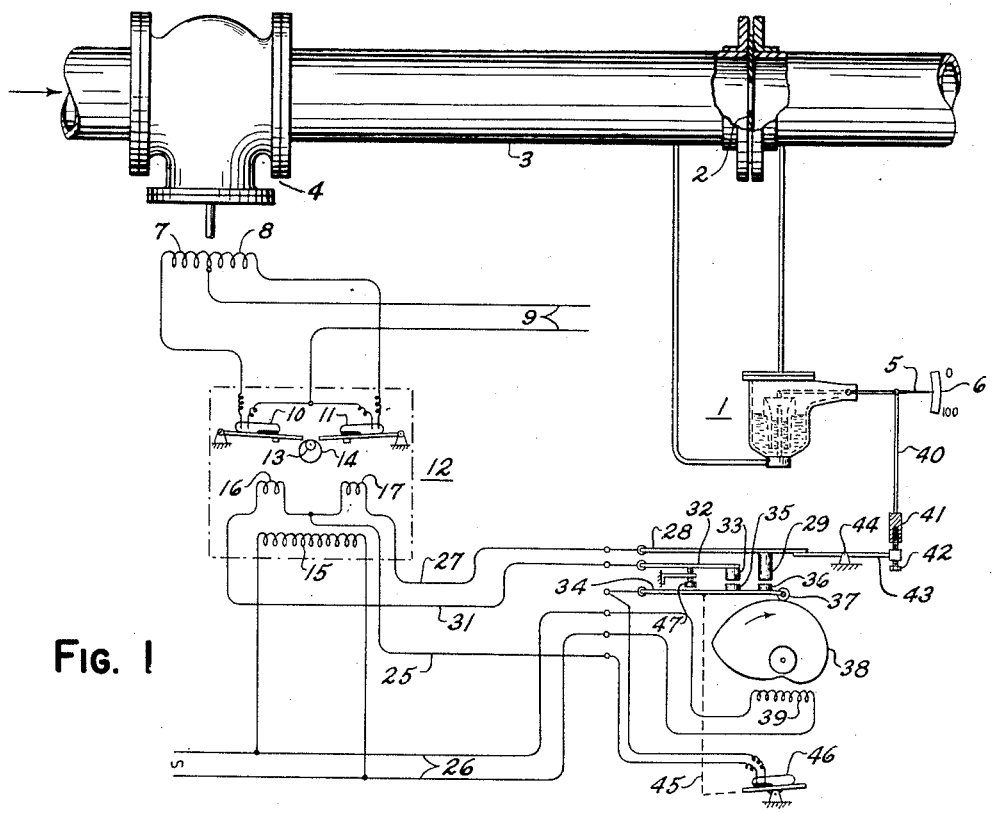
Fig. 1 is a partially diagrammatic representation of a preferred embodiment of my invention.

I have chosen herein to illustrate and describe certain preferred embodiments of my invention. Referring to Fig. 1, I illustrate therein a floating type of control wherein a rate of flow meter 1 is responsive to the differential pressure across an orifice 2 positioned in a conduit 3, through which a fluid such as steam or water is flowing in the direction of the arrow. The flow meter 1 is arranged to control a regulating valve 4 positioned in the conduit 3 ahead of the orifice 2 for varying the rate of flow of fluid therethrough to maintain the rate of flow at a predetermined desired value.

The flow meter 1 is a pressure differential responsive device of the type having a liquid sealed bell whose wall is of a non-uniform cross-sectional area whereby its movement is in non-lineal relation to the differential pressure produced across the orifice 2, but is in lineal relation to the rate of flow of fluid through the orifice. Thus the vertical positioning of the liquid sealed bell within the flow meter, and correspondingly of the external pointer 5 positioned thereby, is in direct or linear relation with the rate of flow of the fluid, and indicates the rate of flow relative to an index 6.

The control valve 4 for regulating or controlling the rate of fluid flow through the conduit 3 is shown only diagrammatically and represented as an electric motor actuated type wherein the windings 7, 8 are representative of the windings of a reversing motor having necessary gear reduction (not shown) between the motor shaft and the stem of the valve 4. The arrangement is such that if either the winding 7 or the winding 8 is energized, then the moving parts of the valve 4 will be positioned in predetermined direction to cause either an increasing or decreasing of the rate of flow of fluid through the valve.

The neutral conductor of the windings 7, 8 is directly connected to a power source 9. The winding 7 is connected to the other side of the power source 9 through a mercury switch 10, while the winding 8 is connected to the power source 9 through a mercury switch 11. The mercury switches 10, 11 are embodied in a relay assembly generally indicated at 12, shown more in detail in Figs. 2, 3, 4, and 5, to be described hereinafter.

In Fig. 1 the relay 12 comprises a motor having a shaft 13 on which is located an eccentric 14 adapted to selectively position either the mercury switch 10 or the mercury switch 11, dependent upon the direction of rotation of the shaft 13, and for the purpose of selectively closing the circuit from the power source 9 to either the winding 7 or the winding 8. The relay motor has a field coil 15 continuously energized across a source of alternating current 26, and two shading coils 16, 17 so arranged and proportioned that if they are simultaneously energized or deenergized then the shaft 13 is not urged to rotation in either direction. If, however, one only of the windings 16, 17 is energized, then the shaft 13 is urged to angular movement in one direction or the other, thereby causing a closure of circuits by either the mercury switch 10 or the switch 11. Thus the energization of the motor coils 7, 8 and thereby a positioning of the valve 4 is under the control of energization of the shading coils 16, 17 of the relay 12.

Referring to Figs. 2 and 3, I show therein in more detail the preferred arrangement of the relay 12 in both plan and elevation. The relay per se is the invention of Paul S. Dickey et al and forms the subject matter of a copending application for United States Letters Patent filed concurrently herewith. It will, however, be herein described in sufficient detail to be readily understood by those familiar with the art.

The motor is of the self-starting alternating current type having shading coils 16, 17 and a continuously energized field coil 15. Direction of rotation of the shaft 13 depends upon whether the shading coil 16 or the coil 17 is energized. If both of the coils are simultaneously energized, or deenergized, then no urge to rotation occurs and the motor is of such a construction that no damage will occur thereto if it remains in a stalled condition wherein all three coils 15, 16 and 17 are continuously energized. It is commonly termed a torque motor on this account.

The mercury switches 10, 11 are positioned on and carried by pivoted leaves 18, 19 normally resting their free ends by gravity on stops 20, 21 and limited in their angular rotation by stops 22, 23.

If one of the shading coils 16, 17 is energized then the rotor 13 and correspondingly the eccentric 14 is urged to angular movement in one direction, for example in clockwise direction. Such movement causes an engagement of the eccentric 14 with the underside of the leaf 18, thus lifting the leaf 18 and the mercury switch 10 in counterclockwise motion around the pivot of the leaf until engaging the stop 22. In like manner an energization of the other shading coil results in a counterclockwise angular movement of the eccentric 14 lifting the leaf 19 around its pivot in a clockwise direction. It will be observed that no complete rotation of the shaft 13 occurs, but that the eccentric moves angularly into engagement with either the leaf 18 or 19, positioning either leaf between the stops 20, 22 or 21, 23. The eccentric will remain in a stalled position until the shading coil is again deenergized, or until the other shading coil is energized. Further the simultaneous energization or deenergization of the coils 16, 17 releases the urge to rotate the shaft 13 and the eccentric 14 falls by gravity to its lowermost or shown position of Fig. 3, whereupon the leaf and mercury switch which had been angularly held against either the stop 22 or 23 returns to its initial or normal position, and in so doing opens the circuit to either the motor coil 7 or 8, as may be clearly seen in Fig. 1.

Fig. 4 schematically illustrates the wiring of the relay of Figs. 2 and 3 and is in that respect quite similar to the wiring of Fig. 1. In Fig. 4 I illustrate switch members 24 for selectively energizing the shading coils 16, 17. The arrangement of Fig. 1 for accomplishing this result will be hereinafter explained.

In Fig. 5 I illustrate schematically the wiring arrangement for the use of a self-starting synchronous alternating current motor having opposed field windings such as might also be used in a relay of this type.

Referring now to Fig. 1, I provide an improved contactor arrangement for energizing the shading coils 16, 17 and thereby causing a positioning of the regulating valve 4, responsive to the value or change in value of the variable under control (in this case rate of flow of the fluid through the pipe 3). The neutral 25 is connected to one terminal of a mercury switch 46. The other terminal of the shading coil 17 is connected through the conductor 27 with an arm 28, pivoted (on the drawings) at its left-hand end and carrying thereon contact 29. The other side of the shading coil 16 is connected by a conductor 31 with a pivoted contact arm 32 having a contact 33 thereon. A third pivoted contact arm 34 carries contacts 35, 36 adapted to engage respectively with contacts 33, 29. The arm 34 has at its free end a roller 37 adapted to engage and ride on the periphery of a continuously rotating time cam 38 positioned by a motor having a winding 39 connected directly across the power source 26.

Freely suspended from the pointer 5 is a rod 40 carrying at its lower end a threaded member 41, into which is threaded a screw 42. The screw 42 is carried by a pivoted lever 43 at one side of the pivot 44. The other end of the pivoted lever 43 supports the free end of the pivoted arm 28, which free end rests thereon by gravity and is therefore positioned representative of the position of the pointer 5, modified by the screw adjustment 41, 42. Positioned with the pivoted arm 34 through proper linkage 45 is the mercury switch 46.

In operation the cam 38 is continually revolved in the direction of the arrow by the motor 39, and thus is termed a "time cam" whereby time is divided into equal increments as represented by revolutions of the cam 38, and such increments may be in the nature of five, ten or fifteen seconds' duration. During each revolution of the cam 38, or during each predetermined increment of time, the roller 37, and thereby the contact arm 34, is angularly moved along definite predetermined paths predicated upon the contour of the cam 38. Thus the contacts 35, 36 are angularly moved along predetermined paths and adapted in their travel to engage respectively the contacts 33, 29 at some portion of their path of movement. The extent of engagement of the contacts 35, 33 in each cycle of the cam 38 is dependent upon the position of an adjusting screw 47. In a preferred arrangement the engagement between the contacts 35, 33 is one-half the effective rise of the cam 38. This percentage of cam rise effective for engagement of the contacts 33, 35 may however be desirably greater or lesser in extent and may be adjusted by the screw 47.

It will be evident that the percentage of each cycle of the cam 38 during which the contacts 29, 36 are engaged will depend upon the lowermost position of the free end of the contact arm 28, which is resting by gravity upon the left-hand end of the pivoted lever 43 positioned by the flow meter 1.

Assume that I desire to maintain a rate of flow of fluid through the conduit 3 at 50% of maximum flow. As illustrated in Fig. 1, the pointer 5 positioned by the flow meter 1 indicates 50% of maximum flow upon the index 6. The parts 40, 41, 42, 43 are in predetermined position and control thereby the position of the contact 29 relative to the contact 36. During a given revolution of the cam 38 the contact arm 34 will cause an engagement between the contacts 33, 35 of a predetermined time duration, and such engagement will energize the shading coil 16 for a definite time increment of that cam cycle. Likewise the contacts 36, 29 will be engaged, energizing the shading coil 17, for the same interval of time during the cam cycle. Thus the simultaneous engagement of the contacts 33, 35 and 36, 29, and likewise the simultaneous energization of the shading coils 16, 17 will not result in any urge to rotation of the shaft 13 and thus no energization of either the coils 7 or 8 for positioning the valve 4, inasmuch as the rate of flow of fluid is as desired and no movement of the valve 4 is required.

Assume now that for some reason, such as demand at a further point in the conduit 3, there is a variation in the rate of flow of fluid through the orifice 2 from the desired value of 50% of maximum. Such variation, indicated as a change in position of the pointer 5 relative to the index 6 through the agency of the flow meter 1 will cause the link 40 to be positioned upwardly or downwardly and will thereby result in a new normal or gravity position of rest of the contact 29. At the new position of the contact 29 engagement therewith by the contact 36 will occur earlier or later, as the case may be, in each cam cycle with reference to engagement of the contacts 33, 35 and thus there will be a time overlap or underlap of energization of the shading coils 16, 17, so that during some slight portion of each time increment one of the shading coils, either 16 or 17, will be energized alone, with the result that the eccentric 14 will be angularly moved in predetermined direction, actuating the switch 10 or 11, and energizing the valve motor windings 7 or 8, for causing a change in the throttling position of the valve 4. For example, assume that the rate of flow of fluid has increased over the desired 50% of maximum, due to some greater demand or other reason. The flow meter 1 responsive to the rate of flow will have caused the pointer 5 to move in clockwise rotation relative to the index 6, and thus the link 40 will be moved somewhat downwardly, the left-hand end of the lever 43 upwardly, and the contact 29 to a new position slightly above its previous position. It will then be observed that while the engagement (during one cycle of the cam 38) between the contacts 33, 35 remains the same time length as before, the engagement between the contacts 29, 36 will be of a shorter duration, inasmuch as the contact 29 is not engaged as soon as previously. Thus the energization of the shading coil 16 will be for a greater time interval than the energization of the shading coil 17, and that overlap or extra amount of energization of the shading coil 16 relative to the shading coil 17 will be effective (through the relay 12) to move the valve 4 in a closing direction tending to decrease the rate of flow through the orifice 2 to the predetermined value.

Upon each revolution of the cam 38 the same action will occur, in that an incremental movement of the valve 4 will be accomplished in proper direction and amount, whereby the rate of flow of fluid is decreased toward the predetermined value. As the rate of flow decreases, the flow meter 1 and parts moved thereby will be returned toward the predetermined value, and thus the contact 29 will be lowered to its previous position, with the result that successive cycles of the cam 38 will cause the overlap of the impulses, or the energization of one shading coil alone to be progressively lesser in extent as the rate of flow approaches the predetermined value. Thus the action is asymptotic in approaching the predetermined desired condition (in this case rate of flow).

It will be evident that if for example the rate of flow were to decrease from that desired, then the action would in general be the reverse. That is, the contact 29 would have a normal or gravity position lower than previously and would be engaged by the contact 36 earlier in the cycle of the cam 38 than the engagement of the contacts 33, 35 and thus the shading coil 17 would be energized ahead of the shading coil 16 and the overlap of energization of the shading coils 16, 17 would then be in a direction to result in an opening movement of the valve 4 for increasing the rate of flow through the conduit 3.

It will be seen that the net effect or positioning of the controlled member (the valve 4) for regulating the variable (fluid flow in this case) is for each time interval (represented by a revolution of cam 38) of a duration determined by the overlap in one direction or the other of engagement of the contacts 33, 35 relative to the contacts 29, 36. The resulting motion is in direction and amount dependent upon said overlap or underlap and is in effect an algebraic summation of the time length of contacts or impulses caused by the engagement of the contacts 33, 35 and the contacts 29, 36.

It may not be desired to control the rate of flow to a value of 50% of maximum, but it might be desired to, by hand, set the control to maintain, for example, 25% of maximum. For this purpose the screw members 41, 42 are provided whereby the same initial position of the contact arm 28 relative to the contact arm 34 is maintained with a different rate of fluid flow and corresponding position of the pointer 5 relative to the index 6.

In any contactor of this general type wherein electric circuits are controlled by open contact points there is the danger or possibility of the contact points becoming dirty or arcing or burning, and thus varying a definite and desired time of engagement and disengagement of the contacts. To obviate such difficulty I have provided that the neutral conductor 25 connecting the shading coils to the contact arm 34 be carried through the mercury switch 46, positioned through the link 45 and the contact arm 34, by the cam 38. Thus I provide that during each cycle of revolution of the cam 38 at a predetermined point the mercury switch 46 will break the power connection to the contact arm 34 and thus will simultaneously deenergize both the shading coils 16 and 17. So in general, I have an arrangement wherein during each time interval as represented by a cycle of revolution of the cam 38 there is an engagement between the contacts 33, 35 and between the contacts 29, 36, in each case for a portion of said definite time interval, and with the provision that both sets of these contacts are deenergized simultaneously through the mercury switch 46. If conditions are as desired, then the engagement of the contacts 33, 35 and 29, 36 will be simultaneous and, inasmuch as they are deenergized together, the closure of the two sets of contacts will be for the same increment of time during that cam revolution. If the value of the variable departs from the predetermined value, then the engagement of the contacts 33, 35 remains as previously, on a time length basis. But the closure of the contacts 29, 36 will be of a greater or shorter duration and the overlap between the two contact closures on a time basis provides a net closure in proper direction and extent to motivate the corrective agent as may be necessary to bring the time length of the contact closures again into agreement.

It will be seen that while in the preferred embodiment I preferably initiate the contact closures at the same or varying instants, but deenergize the two sets simultaneously; I may equally as well arrange so that the energization of the two sets of contacts is simultaneous but the disengagement may be at different times. Furthermore, I might so arrange the contactor that neither the engagement or the disengagement of the two sets of contacts will be simultaneous. In any event the preferred arrangement of my invention is one wherein impulses of opposite sense, and which may be of the same or different time durations are applied in opposing manner in an arrangement where the algebraic summation or net result is made effective for useful work.

Figure 7:
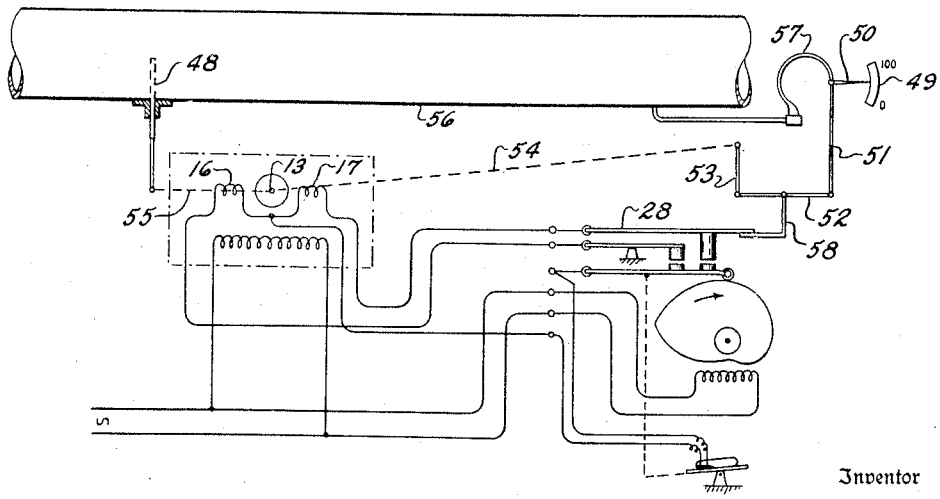
Fig. 7 illustrates a further embodiment of the invention.

As previously mentioned, the arrangement of Fig. 1 is a floating control, wherein the valve 4 may assume any position so long as the desired rate of flow through the orifice 2 is attained. Contra to this the arrangement of Fig. 7 is in the nature of a positioning control wherein there is a definite interrelation between the position of the valve or damper member 48 and the value of pressure indicated on the index 49 by the pointer 50. Freely suspended from the pointer 50 is a link 51 pivoted at its lower end to a freely floating member 52, to which is also pivoted a substantially vertical link 53.

In the arrangement of Fig. 7, a motor having the shading coils 16, 17 is not utilized to position, by the shaft 13, mercury switches 10, 11, but is directly connected to position the damper 48 through suitable gear reduction or other means indicated diagrammatically at 55 and is at the same time adapted to position through gears or linkage 54 the tie-back member 53.

In the present instance the shaft 13 may angularly move in one direction or the other through one or more complete revolutions as may be dictated by the sense and extent of the overlap of the electrical impulses applied to the shading coils 16, 17.

The damper 48 positioned across the conduit 56 controls pressure within the conduit and such pressure is effective within a Bourdon tube 57 for positioning the pointer 50. Assume that the pressure is as desired, then the pointer 50 indicates, relative to the scale 49, the desired pressure, and the position of the links 51 and 53 is such that a central point on the beam 52 from which depends a member 58 is at predetermined or neutral position. Such position of the member 58 dictates that the time length of circuit closure to the shading coils 16, 17 will be uniform and simultaneous, so that there is no resulting overlap or underlap of energization of the shading coils and therefore no resulting movement of the damper 48. If, however, for some other reason pressure within the conduit 56 varies, as for example to increase, then the Bourdon tube would tend to straighten out, raising the pointer 50 along the index 49, raising the link 51, and thereby the member 58, which would result in a circuit closure to the shading coil 17 of a shorter duration than that to the shading coil 16. The overlap of energization of coil 16 relative to coil 17 would cause rotation of the shaft 13 in proper direction and amount to position the damper 48 inwardly across the conduit 56, causing a reduction in pressure therein, and which effective upon the Bourdon tube 57, would tend to return the pointer 50 and linkage 51, 52 to predetermined value. Simultaneously, the rotation of the shaft 13, through the linkage 54, positions the member 53, in an upwardly direction as a "tie-back" to return the member 58 to its initial position.

In this type of geared or positioning control the pointer 50 will never return exactly to predetermined value, but there will be a geared range wherein a certain amount of travel, on the index 49, will be equivalent to complete or substantial travel of the damper 48 and in which range there will be a definite position of the damper for each indicated value on the index 49.

In Fig. 6 I illustrate an arrangement wherein the contact arm 28 has its stop member 59 positioned around a pivot 60 by linkage, a portion of which is positioned, as shown, by a Bourdon tube 61, and another portion by a hand adjustable knob 62. For example, the hand adjustment 62 may be located somewhat remotely to the rest of the apparatus on the face of a control panel board with a pointer adapted to cooperate with an index. Through the position of the means 62 the range or standard whereat the stop member 59 is in predetermined position may be varied readily, either locally or at a considerable distance. The member 59 is shaped to form an elongated slot 75 adapted to receive a pin 76 which is therein slidaly adjusted. The purpose of the pin and slot connection is to vary the "sensitivity" of the control.

In Fig. 8 I illustrate the application of my preferred contactor mechanism in a control system in connection with a plurality of vapor generators. I have chosen to illustrate herein vapor generators 63 and 64 having fuel and air controls actuated by pneumatic or hydraulic mechanisms while vapor generators 65 and 66 have their fuel and air supply devices under the control of electric motor means. The four vapor generators tie into a common steam header 67. Connected thereto is a Bourdon tube 68 sensitive to the pressure in the header and for positioning a pneumatic or hydraulic fluid pilot 69. Such a pilot may be of the type forming the subject matter of Patent #2,054,464 to Johnson.

One example of such a system is wherein two boilers such as 65 and 66 were previously equipped with reversing electric pilot motor actuators for fuel and air control and later it was desired to equip boilers 63 and 64 with pneumatically actuated mechanism on the fuel and air supply lines. The necessity and desirability of tying the control, both from a pressure fluid and electric motivating forces into a common system, jointly responsive to a common factor, such as header steam pressure, is readily solved by the arrangement of Fig. 8.

The essential elements of my invention, as previously described, are embodied in the contactor and relay arrangement of Fig. 8 wherein the relay 12 simultaneously controls the fuel and air supply regulating motors of the boilers 65 and 66, and at the same time controls the direction and extent of motion of a small pilot motor 70 used as a tie-back.

Fluid pressure under the control of the pilot 69 is effective not only for positioning the fuel supply and damper means of the boilers 63, 64, but at the same time is effective through a pipe 71 upon a Sylphon or other expansible contractible means 72, which is interrelated with the pilot motor 70 in the positioning of a stop 73 for the contact arm 28. Variations in fluid pressure in the line 71 as representative of steam pressure within the conduit 67 causes a positioning of the stop 73 through the agency of the bellows 72 so as to vary the length of contact effective upon the shading coils 16, 17 of the relay 12 and thus control the fuel and air supplying means for the boilers 65, 66. As an actuation through the relay 12 occurs in one direction or the other, it is at the same time effective in positioning the pilot motor 70 for restoring the stop member 73 to predetermined position.

Thus all boilers shown, namely 63, 64, 65 and 66, are under the control of a common variable through a common agency, namely the pilot 69, even though the actuating mechanisms on two of the boilers are of a pressure fluid type and on two of the boilers of an electrical type.

The continuously actuated intermittent circuit opening mechanism 74 is provided for the neutral conductor from the boilers 65, 66 so that if desired, the actuation of the motors in connection with these boilers may be intermittently had to prevent any possibility of over-travel and hunting.

In general, I have provided a preferred contactor arrangement and system wherein I periodically initiate impulses of a constant time duration and during the same period initiate other impulses of the same or different duration depending upon the then value of a variable. During each time period the impulses are algebraically added and the overlap or underlap comprising the net as to direction and extent is then made effective as may be desired. It will be seen that the system provides a ready means for remotely telemetering or telemetrically transmitting signals whose direction and extent depends upon values and conditions at the transmitting end, and which may be put to use at the receiving end for indicating, recording or various controlling purposes.

While I have chosen to illustrate and describe certain preferred embodiments of my invention, it is to be understood that I am not to be limited thereby but only as to the claims in view of prior art.

What I claim as new, and desire to secure by Letters Patent of the United States, is:

1. Apparatus for controlling a variable comprising means for cyclically originating first electric impulses of a constant time duration, means for simultaneously therewith originating second electric impulses of a time duration variable in correspondence with changes in the magnitude of said variable, receiver means responsive to both said first and second impulses, a movable member positioned by said receiver means in sense dependent upon which of said impulses is the longer and in amount dependent upon the difference in time lengths of said impulses, means under the control of said movable member for varying the magnitude of said variable in accordance with changes in position of said movable member, and means for directly varying the time length of said second impulses in correspondence with changes in position of said movable member.

2. Control apparatus comprising a first transmitting means for cyclically telemetering signals of a constant time duration, a second transmitting means for cyclically telemetering signals of a time duration corresponding to the magnitude of a variable, receiver means jointly responsive to said signals and having a member positioned in sense dependent upon which of said signals is the longer and in amount dependent upon the difference in time lengths of said signals, and means under the control of said member for altering the magnitude of said variable in a direction tending to bring said signals into equality and simultaneously therewith directly altering the magnitude of said second signals in a direction tending to bring said signals into equality.

3. In a control system in combination, means positioned in accordance with the magnitude of a variable, means actuated by said last named means establishing a fluid loading pressure representative of the value of said variable, an electric contactor cyclically originating signals of a uniform time duration and second signals of varying duration, means under the control of said fluid pressure adapted to vary the length of said second signals, regulating means of said variable under the control of said contactor, and means under the control of said contactor adapted to directly vary the varying duration signal in a direction to bring both said signals into equality.

4. In a control system in combination, means positioned in accordance with the magnitude of a variable, means actuated by said last named means establishing a fluid loading pressure representative of the value of said variable, a first transmitter cyclically originating signals of a uniform time duration and second signals of varying duration, means under the control of said fluid pressure adapted to vary the length of said second signals, a second transmitter receiving said signals and originating a signal equal to the algebraic summation of said second signals, regulating means of said variable under the control of said second transmitter, and electrically actuated means under the control of said second transmitter adapted to directly reposition said first transmitter as to bring into equality said first two originating signals.

5. Apparatus for controlling a variable comprising means for cyclically originating two electric impulses, means for varying the relative time lengths of said signals in correspondence with changes in the magnitude of said variable, receiver means responsive to both said impulses, a movable member positioned by said receiver means in sense dependent upon which of said impulses is the longer and in amount dependent upon the difference in time length of said impulses, means under the control of said movable member for varying the magnitude of said variable in accordance with changes in the position of said movable member, and means directly varying the relative time length of said impulses in correspondence with changes in the position of said movable member.

6. In a control system, in combination, means positioned in accordance with the magnitude of a variable, means actuated by said last named means establishing a fluid loading pressure representative of the value of said variable, an electric contactor cyclically originating two signals, means under the control of said fluid pressure adapted to vary the relative lengths of said signals, regulating means of said variable under the control of said contactor, and means under the control of said contactor adapted to directly vary the relative time length of said signals in a direction to bring said signals into equality.

HARVARD H. GORRIE.